Patented Mar. 9, 1937

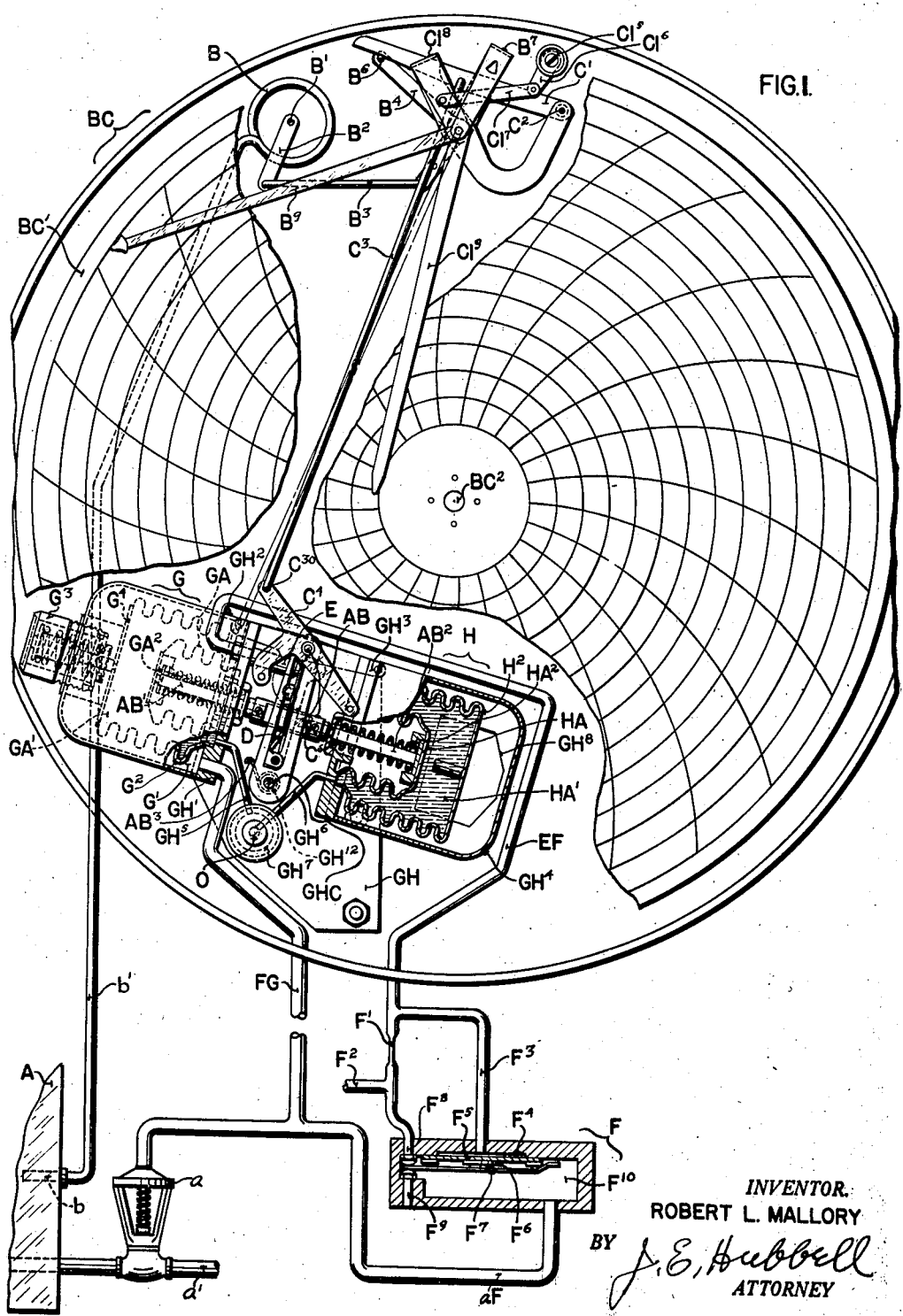

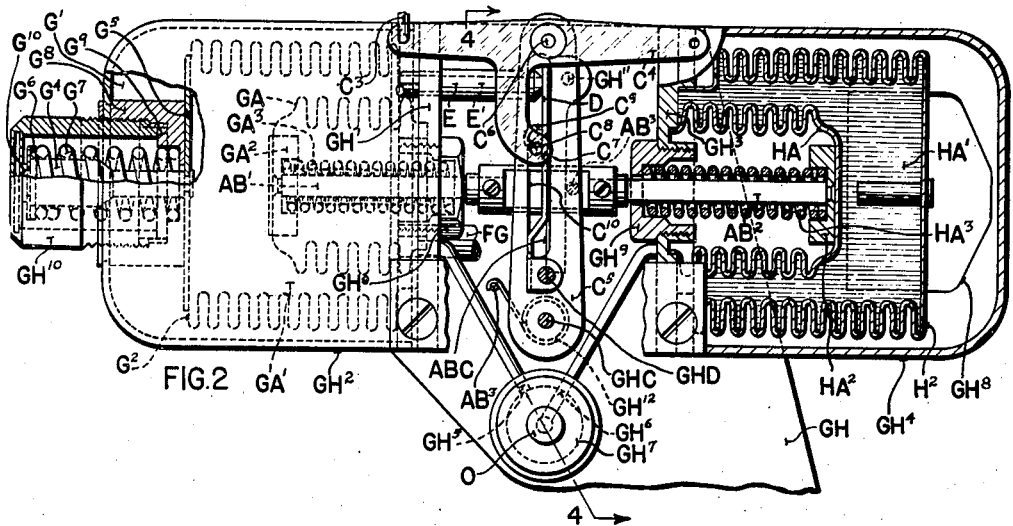

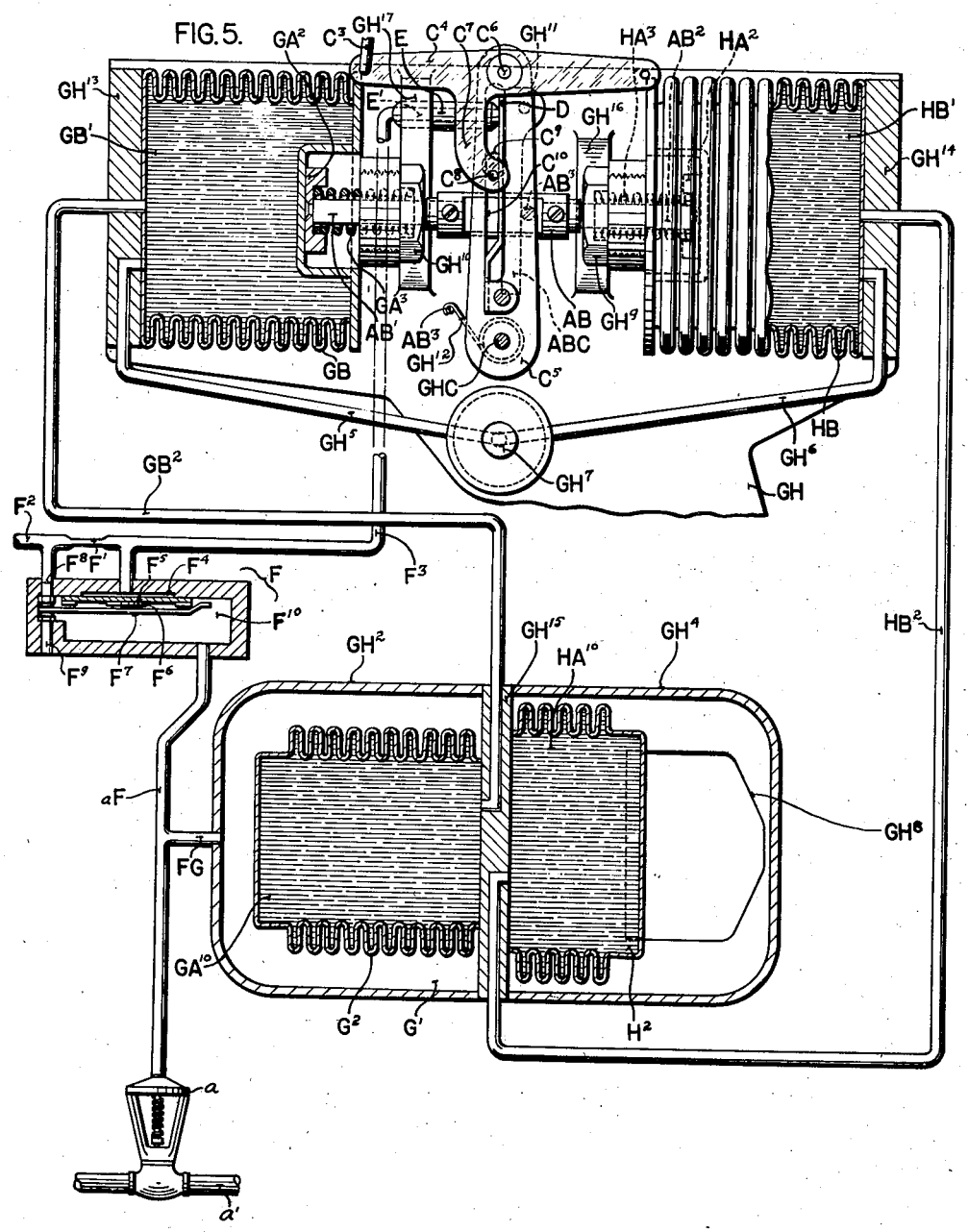

2,072,921

UNITED STATES PATENT OFFICE 2,072,921

FLUID PRESSURE CONTROL APPARATUS

Robert L. Mallory, Philadelphia, Pa., assignor to Brown Instrument Company, Philadelphia, Pa., a corporation of Pennsylvania Application September 26, 1935, Serial No. 42,212

14 Claims. (Cl. 236—82)

The present invention comprises improvements in fluid pressure control apparatus of the type comprising means whereby a departure in the value of a controlling condition from a predetermined or normal value thereof, varies an air or other elastic fluid pressure control force, and whereby such initial variation or adjustment in said control force may produce a second control force adjustment quickly neutralizing more or less of the initial change in the control pressure, and may produce a subsequent third adjustment by which the effect of the second adjustment is neutralized at a rate suitably retarded to insure the regulation or control stability necessary to avoid hunting. Said second and third adjustments are sometimes referred to as "follow up" and "compensating" adjustments, respectively.

In such control apparatus, the extent to which the initial control pressure adjustment is neutralized by the second adjustment, and the rate at which the third adjustment neutralizes the effect of the second adjustment, should be capable of regulation or calibration to enable the apparatus to give desirable results under varying conditions of operation. In particular, such calibration should be effected with regard to, or in accordance with the maximum magnitude of corrective control actions which the particular process or operation controlled can absorb without being unduly disturbed or upset. Such calibration should also be effected with suitable regard to the time constants or lag of the particular process or operation controlled.

For example, when the control process involves a considerable time lag, such as is experienced in a heating operation conducted with heating apparatus having a considerable heat storage capacity, a period of several minutes, or longer, must ordinarily elapse before the full effect of any given change in the rate of heat supply is realized in the heating effect produced. In general, the time required to effect the above mentioned third adjustment should be greater when the time lag of the controlled process or operation is large, than when it is small. For the best control results, also, the control apparatus should be adjusted with reference to the normal or usually to be expected magnitudes of the changes occurring in the control condition. When those changes are relatively large, the extent to which the second or follow up adjustment neutralizes the effect of the initial adjustment, ordinarily should be less than when the magnitudes of the changes are smaller.

As those skilled in the art will understand, under many conditions of operation an initial change in the controlling condition may be followed by another change therein in one direction or the other, due to causes external to the control apparatus, and occurring within the time required for completion of the second and third adjustments, which, but for said other change, would result from the said initial change in condition.

The importance of suitable control apparatus adjustment or calibration features, is augmented by the fact that the attainment of the optimum practical control results requires a compromise between that which is required to eliminate or suitably minimize hunting, and that which is required to minimize the magnitude and duration of departures of the controlled condition from a predetermined normal or standard value of the latter, and that which is required to insure a suitably effective response to abnormal conditions of operation which may be expected to occasionally prevail.

The primary object of the present invention is to provide fluid pressure control apparatus of the above mentioned character, which is characterized by its mechanical simplicity and reliability, and by its inclusion of means for readily effecting various adjustments required for optimum control results under a wide range of operating conditions, and the invention comprises various features of construction and arrangement devised and effective to that end.

Specific objects of the invention are to provide apparatus of the character described, which is compact and is itself free from objectionable time lag, and which is not adversely affected by ambient atmosphere temperature changes. In general, my improved control apparatus may be used wherever it is desirable to produce a control effect in response to a control condition, such, for example, as a temperature, a pressure, a height of liquid level, or a velocity, which may or may not vary, or tend to vary as a result of the control effect produced.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a somewhat diagrammatic representation of a control system including a preferred form of the present invention;

Fig. 2 is an elevation partly broken away and in section, of a portion of the apparatus shown in Fig. 1;

Fig. 3 is a perspective view of another portion of the apparatus shown in Fig. 1;

Fig. 4 is a partial section taken on the broken line 4—4 of Fig. 2; and

Fig. 5 is a somewhat diagrammatic representation of a portion of a control system including a modification of the control apparatus shown in Fig. 1.

In the use of the invention diagrammatically illustrated by way of example in Fig. 1, the supply of fuel through a supply pipe $a'$ to a furnace A, is varied by a fluid pressure motor valve $a$, in accordance with the pressure variations produced in the pressure chamber $F^{10}$ of a pilot valve mechanism F, and produced as a result of adjustments effected by a control instrument BC, which measures and, as shown, is adapted to record, the temperature in the portion of the furnace A in which the fluid pressure thermometer bulb $b$ is located. The instrument BC includes a Bourdon tube or helix B, to the stationary end of which the pressure in the bulb $b$ is transmitted by a tube $b'$. As the temperature of the bulb increases and decreases, the pressure in the helix B increases and decreases and gives clockwise or counter-clockwise movements to an arm $B^2$ which is attached to the free end of the helix and is journalled on a shaft $B'$ coaxial with the latter.

Through operating connections, shortly to be described, angular movements of the arm $B^2$ produce corresponding movements of a pen arm $B^9$, which records the varying value of the furnace temperature in a record chart $BC'$ continuously rotated in the usual manner by the chart driving shaft $BC^2$ of the instrument. Each movement of the arm $B^2$ also gives a corresponding movement to a lever $C'$ and thereby to a valve operating lever $C^4$, and the movement of the latter effects a corresponding initial control force adjustment by changing the relative positions of the part containing a port throttling element of a control valve, which, in the particular form shown, comprises a movable port throttling flapper element D and a stationary port containing nozzle element E having a bleed port $E'$, which is throttled more or less by the flapper D as the latter is moved toward and away from the nozzle E.

The above mentioned second and third adjustments of the pressure in the chamber $F^{10}$, result from adjustments of the flapper D which are not produced by movements of the lever $C'$, but are effected by fluid pressure actuated valve operating means including elements G and H, to the former of which the pressure in the chamber $F^{10}$ is transmitted through the conduit FG. As a result of features of construction and arrangement hereinafter described, the elements G and H are sufficiently compact to permit of their convenient location within a housing for the instrument BC, of moderate size and desirable shape, and in a preferred practical embodiment of the invention, the pilot valve mechanism F is also mounted in the instrument housing, generally as disclosed in the prior application of Harrison and Side, Serial No. 693,388, filed October 12, 1933. The present invention utilizes principles of, and comprises improvements over the invention disclosed and claimed in said prior application.

The means through which the oscillatory movements of the arm $B^2$ are transmitted to the pen arm $B^9$ and lever $C'$, comprise a bell crank lever $B^4$ having one arm connected by a link $B^3$ to the arm $B^2$. The lever $B^4$ is journalled on a shaft $B^5$ and has a hub portion $B^8$ to which one leg of a yoke member $B^7$ is secured. As shown, the other leg of the yoke member $B^7$ is extended to form the pen arm $B^9$. The movements of the bell crank lever $B^4$ are transmitted to the lever $C'$, by a pin $B^6$ carried by one arm of the lever $B^4$ and against which one end of the lever $C'$ is held by gravitational action. The normally stationary, but adjustable fulcrum pivot $C^2$ for the lever $C'$, is carried by a supporting lever C which may be adjusted as hereinafter described. The movements of the lever $C'$ are transmitted to the lever $C^4$ through a connecting link $C^3$. The bell crank lever $C^4$, to one arm of which the lower end of the link $C^3$ is connected at $C^{30}$, is a floating lever, its fulcrum pivot $C^6$ being carried by a lever $C^5$ journalled on a supporting shaft GHC carried by an instrument frame member GH. An arm $C^7$ of the lever $C^4$ carries a pin $C^8$ which, as seen in Figs. 1 and 2, bears against the left hand side of the flapper D, the latter being journalled on a pin GHD carried by the instrument frame part GH. The flapper is lightly biased, as by means of the spring $d$, for movement to the left toward the nozzle E.

The control valve port $E'$ receives air under pressure through a pipe EF from a supply pipe $F^2$, to which the pipe EF is connected through a restricted or throttling orifice $F'$. The port $E'$ bleeds air to the atmosphere, to thereby control the pressure in the pipe EF and associated apparatus, more or less rapidly, accordingly, as the flapper D is farther away from, or closer to the end of the nozzle E at which the port or passage $E'$ opens to the atmosphere.

In the arrangement shown, on an increase in the temperature of the bulb $b$, the lever $C^4$ is turned clockwise about its fulcrum pivot $C^6$, which permits the biased flapper D, to move toward the nozzle E and thereby throttle the flow through the port $E'$ and increase the pressure in the pipe EF. The throttling effect of the flapper D on flow through the port $E'$ depends not only upon the angular position of the lever $C^4$, but on the angular position of its supporting lever $C^5$, which is angularly adjusted, as hereinafter explained, by the mechanism including the previously mentioned elements G and H.

The pressure in the pipe EF is transmitted through a pipe $F^3$ to the chamber $F^4$ of the pilot valve F. The latter operates automatically to maintain a pressure in its pressure chamber $F^{10}$, and hence in the pressure chamber of the fuel controlling motor valve $a$, which is proportional to the pressure in the pipe EF. The chambers $F^4$ and $F^{10}$ of the pilot valve are separated by a flexible diaphragm $F^5$. The latter carries a part $F^6$ through which movements of the diaphragm give corresponding movements to a spring valve member $F^7$ which extends between and controls flow through each of the opposed inlet and outlet ports, $F^8$ and $F^9$, of the pilot valve chamber $F^{10}$. The port $F^8$ is connected to the fluid pressure supply pipe $F^2$. The outlet port $F^9$ opens to the atmosphere. On an increase in the pressure transmitted through the pipe $F^3$ to the chamber $F^4$, the valve $F^7$ is moved in the direction to permit increased flow into the chamber $F^{10}$ from the pipe $F^2$, and to exert an increased throttling effect on the outflow of air through the port $F^9$, thereby increasing the pressure in the chamber $F^{10}$. When the pressure in the chamber $F^4$ diminishes, the valve $F^7$ exerts an increased throttling effect on the inlet port $F^8$, and a decreased throttling effect on the exhaust port $F^9$, and the pressure in the chamber $F^{10}$ is thereby diminished.

From what has already been said, it will be apparent that as the temperature of the bulb $b$ increases, the lever $C^4$ adjusts the flapper D to increase the pressure transmitted to the pilot valve chamber $F^4$, and thereby increase the pressure in the chamber $F^{10}$ transmitted to the fluid pressure valve $a$. The latter is arranged to decrease and increase the flow of fuel to the furnace through the pipes $a'$ as the control pressure in the chamber $F^{10}$ increases and decreases.

The element G of the mechanism which adjusts the flapper D by angularly adjusting the lever $C^5$, comprises a shell or casing $GH^2$ located at one side of, and supported by a head $GH'$ carried by the frame part GH. Within the casing $GH^2$ is a bellows $G^2$ having one end fixed to the head $GH'$ and having its other end closed by an end wall $G^5$, which moves in response to variations in the resultant of the forces acting on the bellows. Those forces include the fluid pressure within the bellows, the control pressure transmitted by the pipe FG to the space $G'$ enclosed by the casing $GH^2$ and surrounding the bellows $G^2$, and a spring force tending to give the bellows $G^2$ a predetermined length. That spring force may be due wholly to the resiliency of the corrugated wall of the bellows $G^2$ or partly to that resiliency and partly to the action of a separate spring $G^7$, hereinafter described.

Within the bellows $G^2$ is mounted a smaller and coaxial bellows GA which has one end attached to the head $GH'$ and has its other end closed and free to move in response to variations in the resultant of the forces acting on the bellows GA. Those forces comprise that due to the pressure of an incompressible liquid, as water or a light oil, which fills the space $GA'$ between the bellows $G^2$ and GA, the pressure of the atmosphere with which the interior of the bellows GA is in free communication, the action of a spring $GA^3$ which opposes the tendency of the bellows GA to contract, and the thrust or pull of a rigid mechanical connection between the movable closed end of the bellows GA and the movable closed end of a bellows HA forming a part of the element H. The force with which the spring $GA^3$ opposes the tendency of the bellows GA to contract, may be varied by an adjustment device in the form of an externally threaded tubular abutment member $GH^9$ loosely surrounding the rod $AB'$ and screwed into a threaded aperture in the end head $GH'$.

The element H is generally similar to the element G, comprising a bellows $H^2$ associated with the bellows HA as the bellows $G^2$ is associated with the bellows GA. Each of the last mentioned bellows and the casing $GH^4$ of the element H are secured to a head $GH^3$ which is parallel to, and is located at the opposite side of the lever $C^5$ from, the head $GH'$ of the element H. The bellows HA and $H^2$ are coaxial with the bellows GA and $G^2$, but the two sets of bellows face in opposite directions, so to speak, so that when the bellows HA and $H^2$ contract or expand, the bellows GA and $G^2$ respectively expand or contract. The bellows $H^2$ is subjected externally to the pressure of the atmosphere, with which the interior of the casing $GH^4$ is in free communication through an opening $GH^8$. The space $HA'$ between the bellows HA and $H^2$, is filled with the same incompressible liquid as is in the interbellows space $GA'$. A spring $HA^3$ which opposes the tendency of the bellows HA to contract, may have its tension varied by a hollow externally threaded abutment member $GH^9$, similar to the previously mentioned member $GH^9$, and screwed into a threaded aperture in the end head $GH^3$.

The two interbellows spaces $GA'$ and $HA'$ are in restricted communication through a flow or pressure equalizing passage shown as comprising conduits $GH^5$ and $GH^6$ and an adjustable throttling valve device $GH^7$. As shown, the throttling effect of the device $GH^7$ is varied by rotative adjustment of a valve operating member O. The latter is rotatably mounted in the outer end of a valve chamber $O'$ formed in the device $GH^7$. The conduit $GH^5$ opens to the chamber $O'$ through the lateral wall and adjacent the inner end of the latter. The conduit $GH^6$ opens to the chamber $O'$ through a passage including an axial port $O^2$ in the inner end wall of the chamber. Communication between the conduits $GH^5$ and $GH^6$ is variably restricted by a valve member $O^3$ which is axially movable in the valve chamber, towards and away from the position in which it engages a seat at the inner end wall of the chamber $O'$ and surrounding the port $O^2$. The valve member $O^3$ comprises a guide piston enlargement $O^4$, which also serves to variably throttle communication between the conduit $GH^5$ and the chamber $O'$, and comprises a stem $O^5$ threaded into a nut portion of the rotatable member O. A pin projection $O^6$ from the stem $O^5$ is received in a longitudinal slot formed in a stationary portion of the valve structure and prevents the valve member from rotating when the operating member O is rotated. A sealing bellows connected at one end to the valve member at the other end to a stationary part of the valve housing structure prevents leakage through the outer end of the valve chamber $O'$.

The previously mentioned mechanical connection between the movable end wall parts $GA^2$ and $HA^2$ of the bellows GA and HA, comprises axial rods $AB'$ and $AB^2$, respectively, connected to said parts, and a sliding block AB between and connecting the rods $AB'$ and $AB^2$. Any longitudinal movement of the block AB results in a turning movement of the lever $C^5$ and thereby varies the position of the flapper D, through means comprising a pin $AB^3$ carried by the block AB, a pin $C^9$ carried by the lever $C^5$, and a lever ABC extending between the two pins and forming a thrust transmitting member through which the block AB and lever $C^5$ interact. The lever ABC is pivoted to the frame part GH at $GH^{11}$. The pin $C^9$ is mounted in, and is adjustable along the length of a longitudinal slot $C^{10}$ in the lever $C^5$ extending transversely to the block AB. The lever $C^5$ is biased for movement in the clockwise direction as seen in Figs. 1 and 2, by a spring $GH^{12}$. On the movements of the block AB, the lever $C^5$ is turned clockwise by the spring $GH^{12}$, or is turned counter-clockwise against the action of that spring by the pin $AB^3$, and the extent of either lever movement, relative to the movement of the pin $AB^3$ in the direction of the bellows axes, depends upon the leverage with which the pin $AB^3$ acts through the lever ABC on the pin $C^9$. That leverage may be varied by the adjustment of the pin $C^9$ longitudinally of the slot $C^{10}$.

In the construction shown, the bellows $H^2$ tends to assume a normal length, partly as the result of the resiliency of its corrugated wall and partly as the result of the action of a spring $G^7$ which surrounds a pin $G^4$ attached to the end wall of the bellows $G^2$ and carrying a removable head $G^6$, forming an abutment for the end of the spring $G^7$ remote from the bellows. The other end of the spring $G^7$ engages an internal flange at the inner end of a tubular abutment member $G^8$ within and attached at its outer end to the end wall of the casing $GH^2$. The head $G^6$ is removably secured to the pin $G^4$ by a cotter pin $G^{10}$, and the spring action on the bellows $H^2$ may be varied in a simple manner by replacing the spring $G^7$ by a stronger or weaker spring. The same adjustment effect could be secured without spring replacement, in various ways, as by threading the head $G^6$ on the pin $G^4$. To permit of spring adjustment while insuring against leakage out of the space $G'$, a cap or spring housing member $G^3$ is threaded into the block $G^8$ to force its inner end into sealing engagement with the soft metal washer $G^9$.

In considering the operation of the apparatus shown so far as it has been described, it is convenient to consider the control operation cycle initiated by an increase in the temperature of the bulb $b$ following a period of stable operation in which the bulb temperature is at a predetermined normal value, and the control pressure in space $G'$ is constant and has been for a time long enough for the various bellows to assume their normal unstretched lengths. In that bellows condition, the pressure of the liquid in each of the inner bellows spaces $GA'$ and $HA'$ will be equal to the pressure of the atmosphere acting externally on the bellows $H^2$. Under the conditions assumed, when the furnace temperature increases, the lever $C^4$ is given a clockwise adjustment about its fulcrum pin $C^6$, and thereby adjusts the flapper D to increase the control pressure in the chamber $F^{10}$ and thereby actuate the valve $a$ to decrease the fuel flow to the furnace.

The increase in the control pressure, which is transmitted by the pipe FG to the chamber $G'$, produces an immediate contraction of the bellows $G^2$ and GA, the latter moving as required to maintain the previously existing volume of the liquid filled interbellows space $GA'$, since this initial bellows movement is effected too rapidly and in a period too short for the flow of a significant amount of liquid from the space $GA'$ through the throttling device $GH^7$ into the interbellows space $HA'$, although said bellows contraction necessarily increases the pressure of the liquid in the space $GA'$ and initiates said flow.

The contraction of the bellows GA produces a corresponding expansion of the bellows HA and $H^2$ through the rigid bellows connection including the block AB. Since the pressure of the atmosphere on the bellows $H^2$ remains constant, regardless of the length of that bellows, the only effect of the expansion of the bellows HA and $H^2$ on the fluid pressure in the space $HA'$, is due to the resiliency of the bellows $H^2$, and is without significance in this connection.

The extent of contraction of the bellows $G^2$ and GA produced by a given increase in the pressure in the chamber $G'$ is that required to increase the force opposing the contraction of the bellows $G^2$, until it balances the effect on the bellows $G^2$ of the pressure increase in the space $G'$. The increase in the force opposing the contraction of the bellows $G^2$ is due in part to the net effect of the contraction on the spring tension of the bellows wall and on the tension of the spring $G^7$, and in part to the increase in the fluid pressure in the space $GA'$. The increase in the fluid pressure in the space $GA'$ is due, in part, to the resiliency of the bellows GA, but is mainly due to the action of the spring $GA^3$, which has its tension increased by the contraction of the bellows GA to an extent regulated by the adjustment of the spring abutment member $GH^{10}$. It is to be noted, however, that the elongation of the spring $HA^3$, and the consequent reduction in the tension of that spring, as the bellows HA elongates, partially neutralizes the effect on the bellows GA of the increase in tension of the spring $GA^3$, and that such neutralizing action is affected by the adjustment of the spring abutment member $GH^9$.

The movement of the block AB produced by the contraction of the bellows GA, operates through the pin $AB^3$, lever ABC, and pin $C^9$ to permit the lever $C^5$ to turn clockwise under the action of its bias spring $GH^{12}$, thereby bodily shifting the lever $C^4$, including its flapper engaging pin $C^8$, to the right, as seen in Figs. 1 and 2. The last mentioned movement of the pin $C^8$ moves the flapper D away from the nozzle E, with the result of decreasing the pressures in the pilot valve chambers $F^4$ and $F^{10}$ and in the space $G'$. The extent to which the initial increase in the control pressure effected by the angular adjustment of the lever $C^4$, is thus neutralized by the second or follow-up adjustment of the control force, due to the clockwise angular movement of the lever $C^5$, depends both on the extent of the movement of the block AB, which is susceptible to adjustment, as has been explained, and upon the leverage with which the pins $AB^3$ and $C^9$ interact through the lever ABC, and that leverage is susceptible of regulation by adjustment of the pin $C^9$ longitudinally of the slot $C^{10}$ in lever $C^5$. Since the second or follow-up adjustment is initiated as soon as the pressure in the chamber $G'$ begins to increase, the initial and follow-up adjustments of the flapper D may be contemporaneous in part, but whether the initial adjustment is completed before or during the time in which the follow-up adjustment is being effected, the ultimate effect of a given increase in the temperature bulb $b$ is a quickly effected adjustment of the flapper D into a position intermediate of its former position and the position which it would have if the movement given pin $C^8$ by the angular adjustment of the lever $C^4$ were not partially neutralized by the angular follow-up adjustment of the lever $C^5$.

As soon as the pressure of the inter-bellows space GA is increased as a result of the pressure increase in $G'$, liquid begins to flow from the space $GA'$ into the space $HA'$. Ordinarily, as previously explained, that flow is too slow to have any significant effect on the pressure in the space $GA'$ during the period required for the completion of the initial and follow-up adjustments. Eventually, however, assuming no further bulb temperature change in the meantime, enough liquid will flow from the space $GA^1$ into the space $HA^1$ to equalize the pressures in the two spaces and to permit the bellows GA to expand and the bellows HA to contract to their normal lengths. The time required for pressure equalization depends in part upon the extent of the initial contraction of the bellows GA, and in part on the throttling effect of the device $G^7$, which may be varied by adjustment of the member O.

As the bellows GA and HA slowly return to their normal lengths, the block AB is moved slowly to the left thereby returning the pin lever $AB^3$, pin $C^9$, and lever $C^5$ to their normal or stable operation positions. This slowly effected return movement of the lever $C^5$ gives the flapper its third or compensating adjustment and neutralizes the effect of the second or follow-up adjustment on the position of the flapper D. The bellows $G^2$, at the termination of the compensating action, will be displaced from its initial position by an amount depending upon the amount of liquid which is transferred from space GA' to space HA' during the interval that the temperature at bulb $b$ was above its normal value. At this time, assuming that the effect of the increased pressure in space $G^2$ has caused sufficient throttling of valve $a$, that the temperature has returned toward its normal value, equilibrium of the apparatus, with bellows HA and GA at their normal lengths, may occur with a pressure in space G' different from the pressure in that space at the commencement of the operations just described.

For steady operation with varying rates of heat output, it is theoretically necessary that the flapper D should occupy a different position for each different heat output rate. In consequence, if the furnace load during and at the end of the assumed operating cycle is less than it was just prior to the beginning of the cycle, the control pressure must be higher at the end of the cycle than it was immediately prior to the beginning of the cycle, and at the end of the cycle the temperature of the bulb $b$ must be above its former and assumed normal value. In practice, however, with control apparatus of the type illustrated which is properly designed and calibrated for the conditions of operation, the differences between the stable furnace temperatures obtained with different loads in any ordinary range of load variation, will be too slight to have measurable or other practical significance. Moreover, where the furnace loads have widely different average values during different periods, each of appreciable duration, the theoretical tendency of the different average loads to result in different bulb temperatures, may be eliminated by suitable adjustments of the fulcrum pivot $C^2$ for the lever C', which may be effected as hereinafter described.

It hardly needs to be pointed out that in an operating cycle initiated by a decrease in the temperature of the bulb $b$, control actions are effected which are precisely analogous, though respectively opposite in direction to, the above described actions occurring in a cycle initiated by an increase in the bulb temperature. Under condition of operation resulting in relatively rapid variations in the controlling condition, initial control force adjustments effected by angular movements of the lever $C^4$, may be repeated, as previously noted, with intervening intervals too short for the completion of the corresponding adjustments effected by the valve operating mechanism including the elements G and H, even though those operations are speeded up as much as good regulation results will permit by the adjustments previously referred to, and particularly by adjustment of the member O to reduce the throttling effect of the device $G^7$. The fact that conditions are such as to frequently or regularly prevent the completion of the third or compensating adjustment following one initial adjustment before a second initial adjustment occurs, does not diminish, but on the contrary, augments the practical value of the control apparatus disclosed, which is capable of good regulation results under conditions too adverse for the attainment of satisfactory regulation with other control apparatus now in general use.

An inherent advantage of the regulating apparatus disclosed, resulting both from its compactness and from its general arrangement, is that the control apparatus proper may have a very small inherent time lag, particularly because the various conduits and flow passage of the control apparatus may be short and of small volumetric capacity, though of ample flow capacity, so that the pressure changes are transmitted through those passages in a practically instantaneous manner.

The previously mentioned adjustments of the fulcrum pin pivot $C^2$ of the lever C' are affected by adjustment of the lever C which forms the support for the pivot $C^2$ about its supporting shaft $C^4$ which is coaxial with the shaft $B^5$. As shown, the lever C is angularly adjusted by manual angular adjustment of a shaft $C^5$ mounted in the instrument framework and frictionally held in any angular position into which it is adjusted. As shown, the shaft $C^5$ is provided both with a knob for finger engagement, and with a kerf for screwdriver actuation, and carries a crank arm $C^6$ connected by a link $C^7$ to a yoke extension of the lever C. One leg of the yoke $C^8$ is extended to form an index or pointer $C^{19}$ which indicates on the chart BC' the normal value which the control apparatus is intended to maintain. When the actual value of the temperature of the bulb $b$ corresponds to the normal value of the temperature at the end of the index $C^{19}$ the pen point carried by pen arm $B^9$ will be at the same radial distance from the axis of the chart BC'.

As already indicated, the inherent theoretical tendency of the apparatus to maintain a bulb temperature which is higher during a period of operation in which the furnace load is light than during the period in which the furnace load is heavy, may be corrected by the adjustment of the lever C to set the index $C^9$ into a position corresponding to a temperature slightly lower or slightly higher than the diameter desirably maintained, when the average furnace load for a time is relatively low or relatively normal. For the usual load variations, however, the adjustment of the lever C for this purpose is unnecessary, and really impractical because the theoretical variation between the temperature maintained under different loads is ordinarily too small to be practically measurable.

The separation of the index $C^9$ and pen arm $B^9$ shown in Fig. 1 for clarity of illustration, does not occur in any regular normal operating condition of the apparatus. In regular operation, the high bulb temperature indicated in Fig. 1 would not occur except with an adjustment of the index $C^9$ to a high temperature value on the scale. That adjustment would lower the link $C^3$ and move the flapper operating pin $C^8$ into engagement with, or at least into immediate proximity to the flapper D. At this point, attention is called to the fact that the link $C^3$ may be connected to either end of the lever C⁴. With the link connected to the right hand end of the lever, as seen in Fig. 1, an increase in the value of the controlling condition decreases the control pressure, as is convenient and desirable in some cases.

The general principles of the present invention may be utilized in apparatus quite different in form from that shown in Fig. 1. Thus, for example, the apparatus shown in Fig. 5 is adapted to give the same control results as the apparatus shown in Fig. 1, from which it differs considerably in respect to the bellows arrangement, though comprising numerous apparatus parts identical with those employed in Fig. 1, and designated by the same reference symbols. In Fig. 5, the bellows GB and HB corresponding operatively to the bellows GA and HA in Fig. 1 are not enclosed, and have their movable end walls facing and adjacent one another, and have their remote ends connected to supporting head portions GH¹³ and GH¹⁴ of the framework part GH. The movable end walls of the bellows GB and HB are connected as are the movable end walls of the bellows GA and HA, and the connecting member AB co-acts with the lever C⁵, and thereby with the flapper D as in Fig. 1.

The spaces GB' and F B' within the bellows GB and HB, respectively, are sealed from the atmosphere and are filled with incompressible liquid, as are the bellows G² and H². The latter may correspond in form, and correspond in function to the correspondingly designated bellows G² and H² of Fig. 1. In Fig. 5, however, the bellows G² and H², with their respective enclosing shells GH² and GH⁴, are located at opposite side of, and are supported by the same head portion GH¹⁵ and are not co-axial with, but are laterally displaced from the bellows GB and HB. The space GA¹⁰, enclosed by the bellows G² of Fig. 4, is in communication with the bellows enclosed space GB' through a conduit GB², and the space HA¹⁰ enclosed by the bellows H² is in communication with the bellows enclosed space HB'. The bellows enclosed spaces GB' and HB' are connected by a restricted pressure equalizing passage, comprising conduit sections GH⁵ and GH⁶ and a throttling device GH⁷ as in Fig. 1.

In the operation of the apparatus shown in Fig. 5, control pressure changes in the space G' are transmitted to the bellows space GB' and result in movements of the movable end wall of the bellows GB similar to, and producing the same control effects, as the movements given the movable end wall of the bellows GA of Fig. 1 by control pressure changes. To avoid time lag and throttling in the transfer of liquid through it, the conduit GB² should have a suitably large flow capacity, as should the conduit HB² through which the liquid is transferred between the bellows spaces HA¹⁰ and HB'. The apparatus shown in Fig. 5 does not include an adjustable spring corresponding to the spring G⁷ of Fig. 1, though it might. That spring, while desirably employed in some cases, is not essential to the attainment of the general advantages of the invention, and may well be omitted in some cases. In Fig. 5, the adjustable abutment members GH⁹ and GH¹⁰ for the springs HA³ and GA³, are threaded through bracket extensions GH¹⁶ and GH¹⁷ from the frame part GH.

In Fig. 5, as in Fig. 1, the bellows G² and GB cooperate to enclose one liquid containing space which is sealed from the atmosphere, and the bellows H² and HB cooperate to provide a second such space. Each such space corresponds, in effect, to one of the two bellows enclosed liquid containing spaces of Fig. 1. In Fig. 5, however, each of the liquid containing spaces is not only divided in two sections separately enclosed by the two corresponding bellows, but also includes a section formed by the corresponding conduit GB² and HB². While the inclusion of the bellows G² and H² in a mechanical unit separate and laterally displaced from the mechanical unit including the bellows GB and HB makes the total bulk of the apparatus greater than required with a single mechanical unit of Fig. 1, in apparatus of given capacity, the dimensions of the last mentioned unit are necessarily greater than that of each of the separate units in Fig. 4, which makes the use of the arrangement of Fig. 4 especially advantageous under certain instrument housing spatial conditions.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Fluid pressure control apparatus comprising a pressure space containing an elastic fluid under regulable pressure, means responsive to said pressure for controlling a variable condition, a valve adjustable to regulate said pressure, means for adjusting said valve in response to changes in said variable condition, and means for adjusting said valve in response to a change in said pressure, the last mentioned means comprising a member adapted to contract and expand in accordance with changes in said pressure, a second expansible and contractible member uniting with the first mentioned member to form an enclosed space, a third expansible and contractible member, a rigid connection between said second and third members, a fourth expansible and contractible member uniting with said third member to provide a second enclosed space and exposed to atmospheric pressure at its side external to said space, and a regulable flow passage connecting said enclosed spaces.

2. Apparatus as specified in claim 1, in which each of the four members specified is a bellows having one end fixed and the other end movable.

3. Apparatus as specified in claim 1, in which the side of each of said second and third members is exposed to atmospheric pressure at its side external to the corresponding enclosed space.

4. Apparatus as specified in claim 1, comprising resilient means tending to maintain the said second and third members in predetermined positions.

5. Apparatus as specified in claim 1, in which the said enclosed spaces and flow passage are filled with liquid.

6. Apparatus as specified in claim 1, in which the two enclosed spaces specified are symmetrically disposed whereby the effect on the apparatus of temperature changes in the ambient atmosphere is minimized.

7. Apparatus as specified in claim 1, in which the said second and third members are coaxial bellows, each having a movable end wall which is connected to the movable end wall of the other by the said rigid connection.

8. Apparatus as specified in claim 1 in which the said second and third members are coaxial bellows each having a movable end wall which is connected to the movable end wall of the other by the said rigid connection, and including means for subjecting each of said end walls to a regulable spring force tending to maintain it in a predetermined position.

9. Apparatus as specified in claim 1 in which the said second and third members are coaxial bellows each having a movable end wall which is connected to the movable end wall of the other by the said rigid connection, and including a separate adjustable spring in engagement with each end wall and opposing the contraction of the corresponding bellows.

10. Apparatus as specified in claim 1 in which the said second and third members are coaxial bellows each having a movable end wall which is connected to the movable end wall of the other by the said rigid connection, and including a separate coil spring associated with each bellows and having one end in engagement with the end wall thereof and surrounding said rigid connection, and a stationary abutment with which the other end of said spring is in engagement.

11. Apparatus as specified in claim 1 in which the said second and third members are coaxial bellows each having a movable end wall which is connected to the movable end wall of the other by the said rigid connection, and including a separate coil spring associated with each bellows, and having one end in engagement with the end wall thereof and surrounding said rigid connection and an adjustable abutment with which the other end of said spring is in engagement.

12. Apparatus as specified in claim 1, in which the said second and third members are coaxial bellows each having one stationary and one movable end, and in which said first and fourth members are bellows respectively surrounding said second and third members.

13. Apparatus as specified in claim 1, in which the said second and third members are coaxial bellows each having one stationary and one movable end, and in which said first and fourth members are bellows respectively surrounding said second and third members and each having a movable end and a stationary end rigidly connected to the stationary end of the element which it surrounds.

14. Apparatus as specified in claim 1, in which the said valve comprises a movable valve member, and in which the first mentioned valve adjusting means comprises a lever engaging said valve member, and in which the second mentioned valve adjusting means includes a lever forming a fulcrum support for the first mentioned lever and operatively engaged by said connection.

ROBERT L. MALLORY.